(12) United States Patent
Gagel et al.

(10) Patent No.: US 8,902,292 B2
(45) Date of Patent: Dec. 2, 2014

(54) METHOD AND DEVICE FOR GENERATING A REPRESENTATION OF SURROUNDINGS

(75) Inventors: Florian Gagel, Uhldingen-Mühlhofen (DE); Jörg Kushauer, Uhldingen (DE)

(73) Assignee: Diehl BGT Defence GmbH & Co. KG, Nuremberg (DE)

( * ) Notice: Subject to any disclaimer, the term of this patent is extended or adjusted under 35 U.S.C. 154(b) by 230 days.

(21) Appl. No.: 13/475,468

(22) Filed: May 18, 2012

(65) Prior Publication Data

US 2012/0249745 A1 Oct. 4, 2012

Related U.S. Application Data

(63) Continuation of application No. PCT/EP2010/006765, filed on Nov. 6, 2010.

(30) Foreign Application Priority Data

Nov. 21, 2009 (DE) .......................... 10 2009 054 214

(51) Int. Cl.
  *H04N 13/02* (2006.01)
  *H04N 7/18* (2006.01)
  *G06T 15/20* (2011.01)
  *G06T 19/00* (2011.01)

(52) U.S. Cl.
  CPC ................. *G06T 15/20* (2013.01); *G06T 19/00* (2013.01)
  USPC .............................................. 348/46; 348/81

(58) Field of Classification Search
  None
  See application file for complete search history.

(56) References Cited

U.S. PATENT DOCUMENTS

| 6,031,941 A | * | 2/2000 | Yano et al. | 382/276 |
| 6,121,999 A | * | 9/2000 | Schaack | 348/45 |
| 7,345,705 B2 | | 3/2008 | Croasdale | |

OTHER PUBLICATIONS

International Search Report of PCT/EP2010/006765, Dated May 30, 2011.
Noor, H., et al., "Virtual Image Generation by View Extrapolation of Real Scenes", Mehran University Research Journal of Engineering and Technology, Oct. 2008, pp. 347-364, vol. 27, No. 4, Pakistan XP002628275, ISSN: 0254-7821.
Wexler, Y., et al., "On the Synthesis of Dynamic Scenes from Reference Views", Proceedings 2000 IEEE Conference on Computer Vision and Pattern Recognition, Jun. 13-15, 2000, pp. 576-581, Los Alamitos, CA, USA, XP001035616.
Shum, H., et al., "A Review of Image-based Rendering Techniques", Proceedings of SPIE, Jan. 1, 2000, pp. 1-12, vol. 4607, SPIE, USA XP002401068.

(Continued)

*Primary Examiner* — Joseph Ustaris
*Assistant Examiner* — Zhubing Ren
(74) *Attorney, Agent, or Firm* — Laurence A. Greenberg; Werner H. Stemer; Ralph E. Locher

(57) ABSTRACT

It is proposed that, on the assumption that the surrounding area forms a known topography, a representation is produced from a form of the topography, the camera position relative to the topography and the image in the form of a virtual representation of the view from an observation point which is at a distance from the camera position. This makes it possible to select an advantageous perspective of objects which are imaged in the image, thus making it possible for an operator to easily identify the position of the objects relative to the camera.

14 Claims, 2 Drawing Sheets

(56) References Cited

OTHER PUBLICATIONS

McMillan, Jr., L., "An Image-based Approach to Three-dimensional Computer Graphics", 1997, pp. 1-206, North Carolina, USA, XP002628276, URL: http://www.cs.unc.edu/~ibr/pubs/mcmillan-diss/mcmillan-diss.pdf.

Watt, A., "3-D Computer Graphik", book, 2002, pp. 498-499, Pearson Education Deutschland, Germany, XP002628277.

Kuerbitz, G., et al., "The ATTICA family of Thermal Cameras in Submarine Applications", Proceedings of SPIE, Jan. 2001, pp. 185-193, vol. 4369, SPIE, USA.

* cited by examiner

METHOD AND DEVICE FOR GENERATING A REPRESENTATION OF SURROUNDINGS

CROSS-REFERENCE TO RELATED APPLICATION

This is a continuation application, under 35 U.S.C. §120, of copending international application No. PCT/EP2010/006765, filed Nov. 6, 2010, which designated the United States; this application also claims the priority, under 35 U.S.C. §119, of German application DE 10 2009 054 214.0, filed Nov. 21, 2009; the prior applications are herewith incorporated by reference in their entireties.

BACKGROUND OF THE INVENTION

Field of the Invention

In order to allow a submarine to reconnoiter a surrounding area as far as possible without being detected, it is known for the submarine to remain close below the water surface and operate a radio link, by a communication mast, which passes through the water surface, or surveilles the surrounding area. However, the submarine is relatively easily accessible to enemy surveillance as a result of the position of the submarine, close below the water surface. The risk of ramming by a marine vessel is also not insignificant. In order to solve this problem, it is known for the submarine to deploy a communication buoy, to which the submarine remains connected. A radio link can be maintained, and the surrounding area can be surveilled by transmitters, receivers and sensors on the buoy.

SUMMARY OF THE INVENTION

It is accordingly an object of the invention to provide a method and a device for generating a representation of surroundings which overcome the above-mentioned disadvantages of the prior art methods and devices of this general type, which allows the surrounding area to be monitored particularly well.

The object is achieved by a method for production of a representation of a surrounding area, in which, according to the invention, at least one image of the surrounding area is recorded by a camera at one camera position and, on the assumption that the surrounding area forms a known topography, the representation is produced from the form of the topography, the camera position relative to the topography and the image in the form of a virtual representation of the view from an observation point in the surrounding area which is at a distance from the camera position.

In this case, the invention is based on the idea that the buoy should be as small as possible, in order not to be detected. A limitation hereto is the fact that the camera position is only slightly above the water surface. When the surveillance image, that is to say the representation of the actual surrounding area, is shown on a display, then it is difficult for an operator to correctly estimate a distance to objects which are located on the water surface.

The choice of a suitable observation point allows the actual surrounding area to be represented virtually in such a way that it is possible to better estimate a distance, for example, between a marine vessel on the water surface and the buoy. For example, if the observation point with respect to the topography is selected to be above the camera position then it is possible to view the objects on the water surface from further above, as a result of which the entire water surface appears over a larger area on the displayed virtual image. The distance can be estimated well by the position of the objects on the surface, which is represented in magnified form by the new perspective.

The virtual representation may be a computer-produced representation from a view into the surrounding area from an observer position, which is produced from image data from at least one image which was recorded from a camera position which is at a distance from the observer position. The distance between the camera position and the observer position may be one meter or more. The observer position may be selected freely. No actual observer is required at the observer position. The virtual representation can be shown on a display device, for example a screen, and can be looked at and for example analyzed by an operator, in order to monitor the surrounding area. If an operator can freely select the observation point, within limits, then a representation which is optimum for the operator can be selected in such a way that an object of interest is represented well within the surrounding area.

In order to produce the virtual representation in a simple form, it is advantageous if voxels which each have three-dimensional spatial information are produced from pixels in the image and the virtual representation is produced from the spatial information in the voxels. The known topography and the camera position, whose position in or above the topography is known, allows a distance from an object imaged at the pixel in the surrounding area to the camera position to be calculated for each pixel. Since the two-dimensional image position of each pixel in the image is known, this two-dimensional information, together with the distance information, allows the spatial information to be associated with each pixel. The three-dimensional position in space of each object which is represented in the pixels is therefore known, all round the camera position.

A position relative to a reference point, for example an origin of a coordinate system, can be associated with each of the pixels, with the aid of the known topography. The reference point may be the camera position, the virtual observation point or a point which is at a fixed position with respect to the buoy, a marine vessel, some other vehicle or a fixed point on land.

Simple trigonometric methods and/or transformation with the aid of the inverse Euler matrix can now be used to produce a view of the topography from the virtual observation point and therefore of the objects imaged, by determining the viewing angle onto points within the topography from the observation point, and associating a pixel in the two-dimensional pixel matrix with each corresponding point. Within certain limits, the topography and the objects located in the topography can now be represented from any desired observation point.

It is therefore possible to form a distance model from the known topography, by which a distance from an object imaged at that pixel to a predetermined point is associated with each of the pixels in the image. The predetermined point may be the camera position or the virtual observation point. If it is the camera point, the distances can be converted to distances between the objects and the observation point. The virtual representation can therefore be produced corresponding to the associated distances. The distance model in each case associates the position of the pixels in the recorded image with a distance from an object which is represented at that pixel to, for example, the camera position or directly to the virtual observation point.

In a further advantageous embodiment of the invention, at least two images are recorded from different points, and the virtual representation is produced from image fusion of the two images. By way of example, this allows pixels of each of the two images to be associated with the three-dimensional spatial information, and pixels with the same spatial information from the two images can be fused to form one pixel in the virtual representation. The representations of the two images may entirely or partially overlap, in which case the image fusion is expediently carried out only for the overlapping part.

Simple production of three-dimensional spatial information or distance information in each case relating to one pixel can be produced if a planar surface is assumed as the topography and the camera position is arranged above the surface.

Expediently, the camera position is determined for each image within or above the topography when a plurality of images are being recorded, in particular in the situation when the virtual representation is fused from the images.

The camera position is expediently determined with the aid of a sensor. The sensor may be an acceleration sensor, in which case the camera position can be determined by double integration and a fixed reference point. The fixed reference point may, for example, be a known mean position. In the case of a buoy or a marine vessel, the camera position fluctuates about this mean position, although it is located at the known mean position when averaged over time.

In addition, it is advantageous to determine the camera alignment into the surrounding area. This is particularly advantageous when a plurality of images are recorded with a different camera alignment. The camera alignment can be determined with the aid of a sensor, for example an acceleration sensor and/or a compass, for example, with the aid of a known and mean alignment, for example a mean elevation. Determination of the camera alignment relative to the topography allows the image section located in the topography to be determined, and thus makes it possible to detect the position of the pixels, or of objects imaged in these pixels, in the topography.

Alternatively, or in addition to this, an alignment of the image in the topography can be determined on the basis of image information, by image processing. For example, an imaged horizon can be used to determine the elevation of the camera or the imaged sun, together with the time of day and the date, can be used to determine an azimuth angle and elevation angle of the camera alignment.

A further advantageous embodiment of the invention proposes that when there is a movement of the camera a recording time of the image is selected as a function of the camera position. By way of example, if the camera is moved up and down on a marine vessel or a buoy as a result of the sea state, it is advantageous for the recording time to be selected such that the camera position is as high as possible above a mean position. This makes it possible to achieve a good overview of the surrounding area, and there are few image disturbances caused by imaged wave troughs and wave peaks concealing the horizon, whose real topography is inconsistent with the assumed topography. By way of example, it is possible to select a recording time above a predetermined height above a reference point. The predetermined height may in turn be made dependent on the magnitude of the movement of the camera position within, for example, a predetermined time interval.

The invention also relates to an apparatus for production of a representation of a surrounding area, by a camera at a camera position, a processing device, a data memory in which data relating to an assumed topography of the surrounding area is stored, and a display device for displaying the representation. The processing device is provided in order to control a recording of at least one image of the surrounding area by the camera and for production of the representation in the form of virtual representation of the view of an observation point which is at a distance from the camera position, with access being made to the data of the topography, the camera position relative to the topography and the image.

The processing device is advantageously configured to control the way in which any desired, or plurality of desired, or all, of the above-mentioned method steps are carried out. A design such as this can be provided by an appropriate control program in the processing device, whose running—for example in conjunction with suitable input signals, such as sensor signals—results in such control.

Objects of interest can be identified reliably as such from the virtual representation, for example, a boat on a collision course. The processing device is advantageously configured to identify such objects and to control the camera such that it is aligned with the object by a controlled movement.

Further advantages will become evident from the following drawing description. The drawing illustrates exemplary embodiments of the invention. The drawing and the description contain numerous features in combination which a person skilled in the art will expediently also consider individually and combine to form further worthwhile combinations.

Other features which are considered as characteristic for the invention are set forth in the appended claims.

Although the invention is illustrated and described herein as embodied in a method and a device for generating a representation of surroundings, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
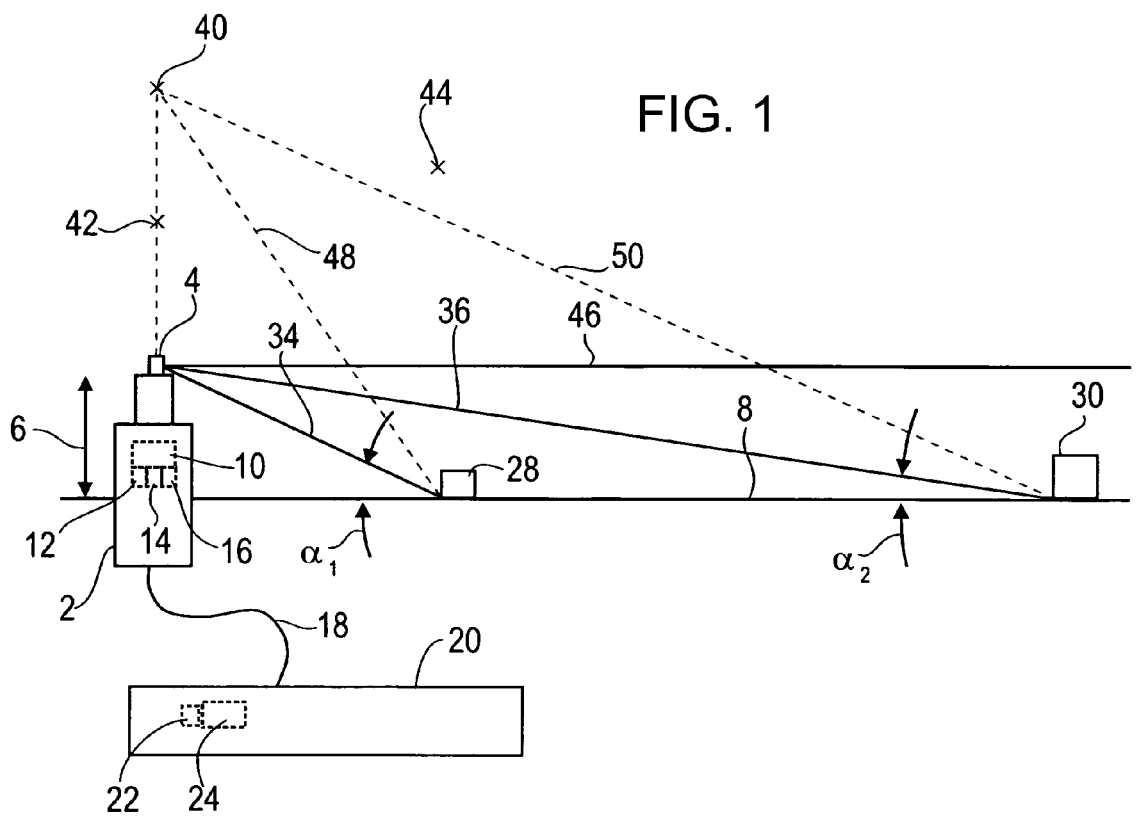
FIG. 1 is a schematic illustration of a surveillance buoy, which is connected to a submarine and has a camera according to the invention.

Referring now to the figures of the drawing in detail and first, particularly, to FIG. 1 thereof, there is shown a communication and surveillance buoy 2 having a camera 4 which is arranged at a height 6 above a water surface 8 when the sea is calm. For signaling purposes, the camera 4 is connected to a processing device 10, which is arranged in the interior of the surveillance buoy 2 together with a data memory 12, an acceleration sensor 14 and a compass 16. The surveillance buoy 2 is connected via a towing cable 18 to a submarine, which is towing the surveillance buoy 2. Data can be transmitted via the towing cable 18 from the processing device 10 to a further processing device 22 in the submarine 20, which is connected to a display device 24 in the form of a screen. The surveillance buoy 2 forms an apparatus for production of a representation of a surrounding area on the display device 24 in the submarine 20. For this purpose, the recording of a plurality of images with the aid of the camera 4 is controlled by the processing device 10. The images are recorded successively in time. In addition to the camera 4, further cameras can be used, which are aligned in other directions, in such a way that it is possible to use the camera images to produce a panoramic image, in particular, an image with an all-round view.

Figure 2:
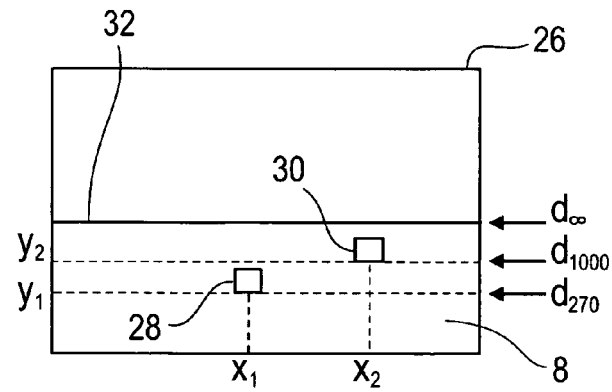
FIG. 2 is an illustration of an image, recorded by the camera, of a surrounding area with two objects.

FIG. 2 illustrates a single image 26 from the camera 4. FIG. 2 schematically illustrates the view of the camera 4 of the water surface 8 and two objects 28, 30 which are illustrated only schematically in FIG. 2 and are floating on the water surface 8, each at a distance from the camera 4. The illustration also shows the horizon 32. The alignment of the camera 4 with respect to the objects 28, 30 in each case defines a viewing line 34, 36 whose elevation angles $\alpha_1$ and $\alpha_2$ and azimuth angles define the position of the respectively imaged object 28, 30 in the image 26 (FIG. 1). The direction of each viewing line 34, 36 of the camera is uniquely defined by the elevation angles $\alpha_1$ and $\alpha_2$ and the respective associated azimuth angles.

FIG. 2 schematically illustrates how the objects 28, 30 would be seen in the image 26 if this were displayed on the display device 24. Each object 28, 30 is associated with image coordinates $x_1, y_1$ and $x_2, y_2$, from which the viewing lines 34, 36 to the objects 28, 30 can be determined. The short height 6 of the camera 4 above the water surface 8 means it is difficult to estimate the distance between the objects 28, 30 and the camera 4 in the image 26, even though they are relatively far apart from one another and from the camera 4—as can be seen in FIG. 1.

Figure 3:
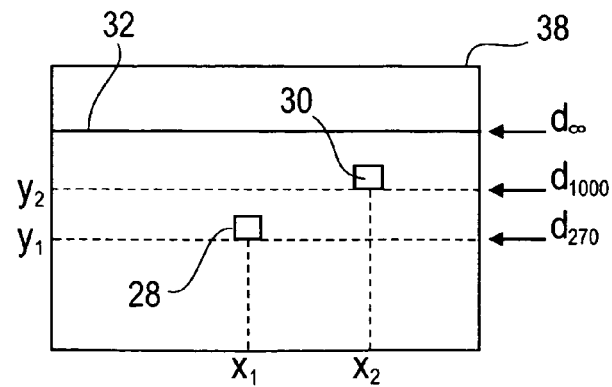
FIG. 3 is an illustration of a virtual image of the two objects from a higher observer position.

The processing device 10 therefore produces a virtual representation 38 of the surrounding area, which is illustrated in FIG. 3. The virtual representation 38 shows a view of the surrounding area from an observation point 40 which is located several meters, for example 20 m, above the camera position. This observation point 40 can be selected freely, within limits, and is defined by an operator in the submarine 20, with the aid of an input into the processing device 22, with a data processing program passing data produced therefrom to the processing device 10 in the surveillance buoy 2, and with the surveillance buoy 2 producing the virtual representation 38. It is likewise feasible for the images 26 which are created by the camera 4 to be transmitted to the submarine 20, and for the virtual representation 38 to be produced by the processing device 22 in the submarine 20. Instead of the observation point 40, other observation points 42 or 44 are also feasible, and need not necessarily be arranged above the camera position.

The virtual representation 38 is produced on the assumption of a known topography of the surrounding area, in which the objects 28, 30 are located. In the example illustrated in FIG. 1, the topography is a planar surface in the water surface 8, which is considered to be planar. When the sea is calm, the water surface 8 essentially forms a planar surface, as a result of which this model matches the real surrounding area well. The distance of the objects 28, 30 from the camera position 4 can be determined from the elevation angles $\alpha_1$, $\alpha_2$ of the object 28, 30, by a simple trigonometric relationship.

The virtual representation 38 is produced using a distance model which associates a defined point in three-dimensional space with each pixel of the image 26, or at least of a number of the pixels in the image 26. The coordinates of the three-dimensional space may be related to a fixed point, for example, the camera position or some other predetermined point, which may be fixed in position or may be moving. The distance model is based on the assumption of reducing the options for the position of the imaged objects 28, 30 to a two-dimensional landscape or topography, whose shape forms the basis of the distance model. A location or viewing point in the landscape or topography therefore can be associated with the pixels in each image 26. Without the distance model, the pixels would be associated only with a viewing line 34, 36. The predetermined topography of the distance model reduces the possible position of the imaged objects 28, 30 to the intersection of the viewing line 34, 36 with the topography, and therefore to a unique point, which is located at a distance from the camera 4 which can easily be calculated, and can therefore be provided with specific three-dimensional coordinates with respect to a reference point. The pixels in an image 26 therefore become a voxel whose three-dimensional coordinates are fixed. The horizontal viewing line 46 is in this case directed at the horizon 32, as a result of which those pixels which image the horizon 32 can be associated with infinite distance. The procedure can likewise be used for all pixels above the horizon.

The distance $d_{270}=270$ m from the recording camera 4 is associated with the object 28, and the distance $d_{1000}=1000$ m from the recording camera 4 is associated with the object 30, on the basis of the topography, which is assumed to be known, the height 6 of the camera 4 above the topography, and the elevation angles $\alpha_1$, $\alpha_2$. By way of example, if the topography is planar, the elevation angles $\alpha_1$, $\alpha_2$ can be used to determine the distance d using the relationship d=h/sine $\alpha$, where h is the height 6. The position in space of the objects 28, 30 relative to the recording camera 4 is known in this way and from the azimuth angle which can be determined by the position of the objects 28, 30 in the image 26.

Since the distance to the objects 28, 30 is generally defined by their lower edge or the position of their lower edge or their lowest point in the image 26, this position of the lower edge or of the lowest point is taken into account when determining the distance and position.

The distance to and the relative position of the objects 28, 30 with respect to the observation point 40 can be determined with the aid of the known relative position of the observation point 40, which is defined by the operator with respect to the camera position of the recording camera 4 by simple coordinate transformations and the position of objects 28, 30 in the virtual representation 38 can be determined by simple trigonometry. The corresponding virtual viewing lines 48, 50 to the objects 28, 30 are illustrated in FIG. 1. Their elevation angles are greater, as a result of which the objects 28, 30 are separated further from one another vertically in the virtual representation 38. In addition, their distance from the horizon 32 is greater. This makes it easier for an operator to estimate the position thereof relative to the camera 4 thus permitting the operator to have a better image of the surrounding area.

Instead of the planar topography, any feasible topography which can correspondingly be assumed to be known is possible, in principle. If this topography is known or approximately known, and the processing device 10 has access to data which represents this topography and, for example, may be stored in the data memory 12 or is calculated from a position of the camera 4, for example when used in a moving land vehicle, and a known landscape, then the distance model can also advantageously be applied to uneven topography.

In order to determine the height 6, knowledge of which is a precondition for the determining of the virtual representation 38, the surveillance buoy 2 is provided with the acceleration sensor 14. In the event of wave motion, the height 6 of the camera 4 above the water surface, and in particular above a water surface 8 which is completely smooth and regarded as being planar, fluctuates. The acceleration sensor 14 can measure the acceleration, and the respective location of the acceleration sensor 14, and therefore of the camera 4 can be determined by double integration. This depends on knowing the location at a defined time, at which the integration can start.

Figure 4:
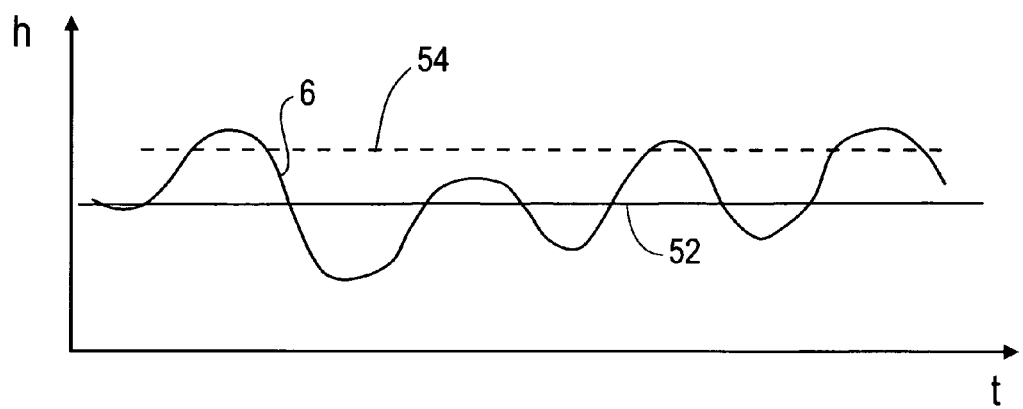
FIG. 4 is a graph of an upward and downward movement of the surveillance buoy over time.

FIG. 4 schematically plots the height 6 with respect to the time t in a graph. Over a long time period, the mean height 52 averages the height 6 of the camera 4 above the water surface 8, when the water surface is completely calm. Even in the event of a major fluctuation in the height 6, as illustrated in FIG. 4, this mean height 52 can be determined by averaging over a relatively long time period, and can be used as a correction measure, to counteract any drift which is subject to error.

FIG. 4 also shows a height 54, which is predetermined for example by the processing device 10, and is used as the initiation height for recording of images 26 of the surrounding area. This results in images 26 being recorded only when the camera 4 is above this predetermined height 54, and therefore has a good view of the waves surrounding it. In addition, the acceleration sensor 14 can determine the upper reversal point position of the camera 4, as a result of which the images are recorded at the greatest height above the mean water surface 8. No images are recorded at small wave peaks below the height 54. In this case, the predetermined height 54 is expediently made dependent on the magnitude of the movement, as a result of which if it is located at a higher level, the greater the height of the waves, and the greater the fluctuation in the height 6 of the camera 4.

In addition to the height 6 of the camera 4 above the topography, the elevation angle of the alignment of the camera 4 must also be known, that is to say whether the camera 4 is aligned to a greater extent upward or downward, at the moment when the image is recorded. This elevation angle fluctuates because of the height of the waves, and therefore has to be determined. The elevation angle can relate to any direction defined for camera alignment, for example, to the image center of a recorded image 26. A further sensor, for example a gravitational sensor, may be used to determine the elevation alignment of the camera 4 in the event of movement of the surveillance buoy 2, with this sensor measuring the alignment of the surveillance buoy 2 in space, and therefore that of the camera 4. This sensor may also be assisted by the acceleration sensor 14 or by some other acceleration sensor, in order to measure the alignment quickly and accurately.

If the height of the camera 4 and the alignment of the surveillance buoy in space and therefore the alignment of the camera 4, are known at least with respect to their elevation angles then a virtual representation 38 can be produced. In addition, it is advantageous for the alignment of the camera 4 to be defined with respect to the azimuth angle, for example the image center of the recorded images 26, relative to a defined direction, for example, a compass point. This can be done by the compass 16, which can also be replaced by any other desired suitable sensor. It is also possible to use the compass 16 for only a rough and mean azimuth angle determination, and to additionally use the acceleration sensor 14 or some other acceleration sensor for fine determination, measuring a rotation of the surveillance buoy about its vertical axis.

In consequence, the absolute alignment of the camera 4 and therefore of the images 26 in the surrounding area is known, as a result of which it is also possible to determine the absolute position of the objects 28, 30, for example in terms of geographical latitude and longitude.

In order to avoid drift, which results in an error, in the alignment determination of the camera 4, the alignment of the camera 4 can additionally or alternatively be determined from image information by image processing. When an object whose position in space is known, for example the horizon 32, is imaged and identified, then the alignment of the camera 4 can be determined on the basis of the image data of this object, for example, the elevation angle on the basis of the position of the horizon 32 in the image 26. The imaging of the sun and its use as an object whose position is known, also makes it possible to calculate the elevation angle and the azimuth angle of the image, and of a known point, for example, the centroid of the image 26.

Figure 5:
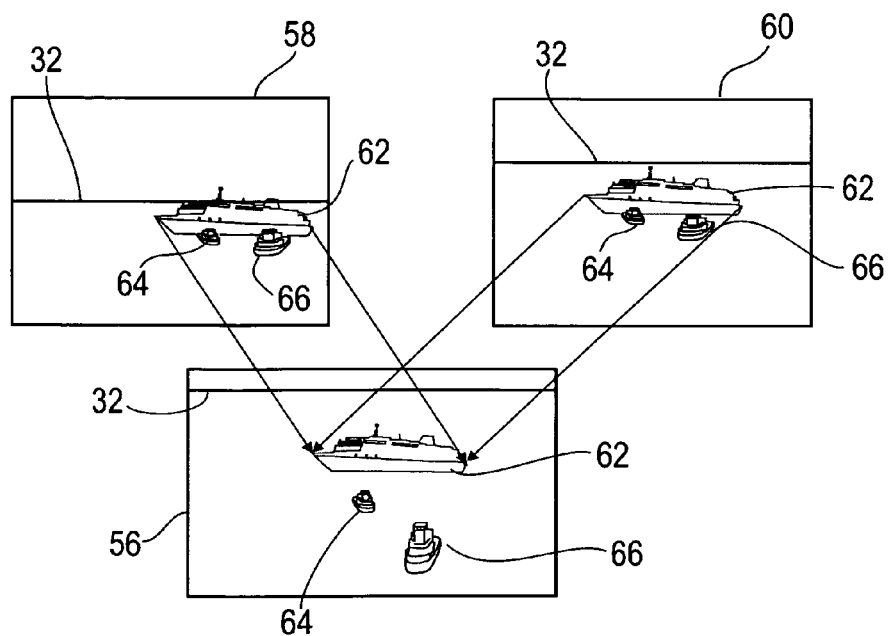
FIG. 5 is an illustration showing how two images, recorded by cameras from different positions, of three objects are formed into a virtual representation of the three objects, by image fusion of the first two images.

Furthermore, it is possible to produce a virtual representation 56 from two images 58, 60 whose alignment in the surrounding area is not the same. One example of this is illustrated in FIG. 5. The images 58, 60 show three objects 62, 64, 66 from two different camera positions and camera alignments. The first image 58 shows the object 62 from a relatively low height 6, as a result of which its upper edge partially covers the horizon 32. The height 6 of the camera 4 in the second image 60, which was recorded, for example a short time period after the first image 58 is somewhat higher, as a result of which the object 62 appears somewhat lower relative to the horizon 32. The two objects 64, 66, which are located in front of the object 62, are likewise arranged somewhat lower relative to the object 62. Furthermore, the camera 4 is rotated somewhat to the right between the moments when the first image 58 and the second image 60 were recorded, as a result of which the objects 62, 64, 66 are arranged more in the image center in the second image 60 than in the first image 58. Thirdly, the elevation angle of the image center of the second image 60 is lower than in the case of the image 58, as can be seen from the fact that the horizon 32 is higher in the image 60 than in the image 58.

Because the objects 62, 64, 66 are arranged close together in the images 58, 60, it is difficult for an operator in the submarine 20, or for any desired operator who is looking at the display device 24, to estimate the absolute position of the objects 62, 64, 66 relative to the camera 4.

Analogously to the explanation relating to FIG. 3, this estimation can be simplified by producing the virtual representation 56, which shows the objects 62, 64, 66 from a higher position, for example, at the high observation point 40. The elevation angle of the image center of the virtual representation 56 can also be selected freely. In the example illustrated in FIG. 5, this elevation angle has been selected such that the horizon 32 is very close to the upper image edge, since the sky above the horizon 32 is of little interest to the operator. Because of the higher observation point 40, the objects 62, 64, 66 are now separated from one another in the virtual representation 56, as a result of which it is considerably easier to identify the distance between them, on the one hand, and on the other hand, their distance from the camera 4, than from the images 58, 60.

Furthermore, image fusion of the images 58, 60 can be used to create a larger panoramic image, as a result of which the virtual representation 56 covers a wider azimuth angle range than each of the images 58, 60. This also makes it possible to produce a plurality of images to form a semicircular panoramic representation, or even a panoramic representation covering 360°, with an all-round view.

The image fusion of the two images 58, 60 or further images to form a wide-angle panoramic representation can be done as follows. In the area where the two images 58, 60 overlap, two pixels are assigned to each point in the surrounding area, specifically a pixel in the image 58 and a further pixel in the image 60. These two corresponding pixels have the same position coordinates with respect to the camera position, or with respect to any other desired or known point. They are therefore imaged superimposed in the resultant panoramic image 56. This can be done by weighted gray-scale determination, as a result of which a relatively bright pixel and a relatively dark pixel result in a pixel of medium darkness. The corresponding association of the pixels in the image 58 and image 60 with the virtual representation 56 is indicated by arrows in FIG. 5.

Instead of the imaging of the two corresponding pixels at one pixel in the panoramic image 56, this can be resolved more finely, thus making it possible to take account of an incomplete overlap of the two corresponding pixels. When producing a panoramic image, an operator can also display only sections of the panoramic image or, for example, can create a continuous all-round view, or a view of a wide azimuth angle, by rotation of the viewing direction.

Production of the virtual representations 38, 56 makes it possible to achieve the further advantage that this overcomes a change in the alignment of the images 26, 58, 60 resulting from the fluctuation of the camera 4. For example, if a plurality of virtual representations are produced successively from one observation point 40, then a defined elevation angle of the virtual representations 38, 56 can always be selected such that no fluctuation can any longer be seen in these representations 38, 56. The operator can concentrate completely on the objects 28, 30 and 62, 64, 66 without having to repeatedly search for them visually in the fluctuating image.

Furthermore, the virtual representation 38, 56 can be used, for example by image processing, to automatically identify objects 28, 30 or 62, 64, 66 with the camera 4 automatically being aligned with these objects 28, 30, 62, 64, 66. This makes it easier for an operator to find the objects 28, 30 or 62, 64, 66. Depending on the nature of the objects, further actions can also be controlled, for example an alarm in the event of a collision course or if a specific type of object is detected and/or items can be prepared, for example defensive weapons.

The invention claimed is:

1. A method for producing a representation of a surrounding area, which comprises the steps of:
    recording at least one image of the surrounding area by a camera disposed over a sea of water at one camera position;
    providing a processing device and on an assumption that the surrounding area forms a known topography, producing the representation from a form of the topography, the camera position relative to the topography and the at least one image in a form of a virtual representation of a view from an observation point which is at a distance from the camera position; and
    selecting a recording time of the at least one image in dependence on a height of the camera, which fluctuates about a mean camera height as a result of a sea state, such that the at least one image is recorded only when the camera is above a predetermine height, which is higher relative to the mean camera height.

2. The method according to claim 1, wherein the observation point is above the camera position.

3. The method according to claim 1, wherein the observation point can be freely selected by an operator, within limits.

4. The method according to claim 1, which further comprises:
    producing voxels which each have three-dimensional spatial information from pixels in the image; and
    producing the virtual representation from the three-dimensional spatial information in the voxels.

5. The method according to claim 1, which further comprises:
    forming a distance model from the topography, pixels in the image are each associated with an aid of the distance model with a distance between a predetermined point and an object which is imaged at that pixel resulting in associated distances; and
    producing the virtual representation corresponding to the associated distances.

6. The method according to claim 5, wherein the pixels are each associated with an aid of the known topography with a position relative to a reference point.

7. The method according to claim 1, which further comprises recording at least two images from different points, and the virtual representation is produced from image fusion of the two images.

8. The method according to claim 1, wherein the topography is a planar surface and the camera position is disposed above the planar surface.

9. The method according to claim 1, which further comprises recording a plurality of images, and determining a camera position for each image.

10. The method according to claim 9, which further comprises determining the camera position with an aid of a sensor.

11. The method according to claim 1, which further comprises recording a plurality of images, and determining a camera alignment into the surrounding area for each of the images.

12. The method according to claim 1, which further comprises determining an alignment of the image in the topography on a basis of image information, by image processing.

13. The method according to claim 1, which further comprises selecting the camera position in dependence on a magnitude of the movement.

14. An apparatus for producing a representation of a surrounding area, the apparatus comprising:
    a camera disposed over a sea of water at a camera position;
    a processing device;
    a data memory containing data relating to an assumed topography of the surrounding area;
    a display device for displaying the representation, said processing device controlling a recording of at least one image of the surrounding area by said camera and for producing the representation in a form of a virtual representation of a view from an observation point which is at a distance from the camera position, with access being made to the data of the topography, the camera position relative to the topography and the at least one image; and
    an acceleration sensor for determining a height of the camera, which fluctuates about a mean camera height as a result of a sea state, said processing device being adapted to select a recording time of the at least one image such that the at least one image is recorded only when the camera is above a predetermine height, which is higher relative to the mean camera height.

* * * * *